INVENTOR.
Theodore Ongaro.
BY
ATTORNEYS.

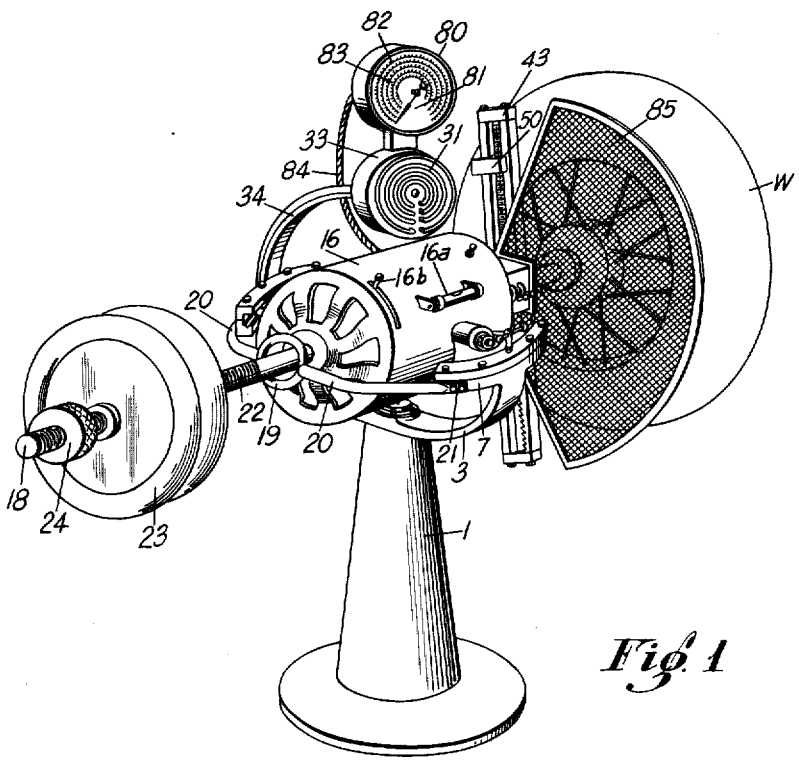
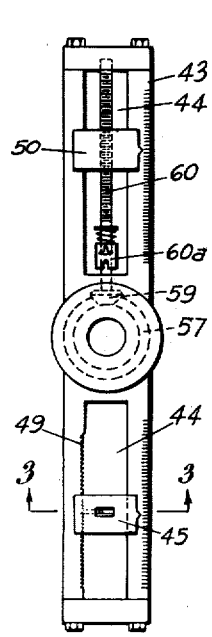
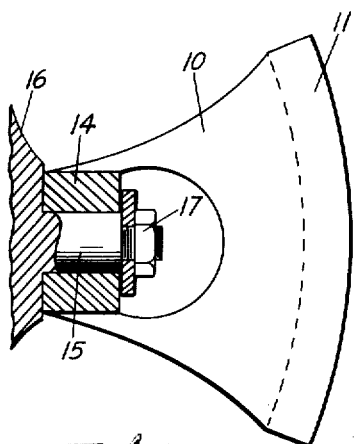

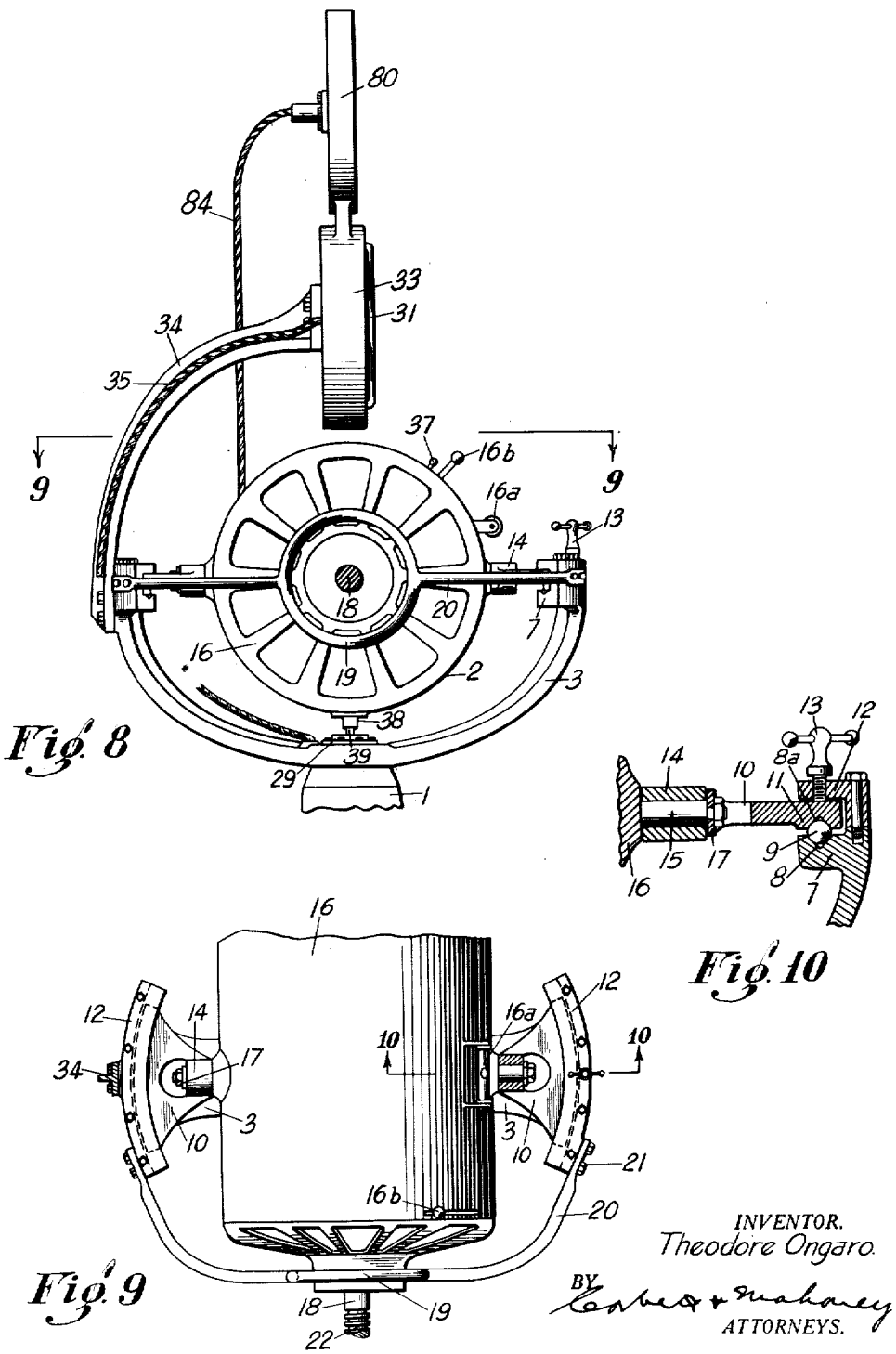

May 30, 1939. T. ONGARO 2,160,314
BALANCING MACHINE
Filed Nov. 16, 1935 4 Sheets-Sheet 4

INVENTOR.
Theodore Ongaro.
BY
ATTORNEYS.

Patented May 30, 1939

2,160,314

UNITED STATES PATENT OFFICE 2,160,314

BALANCING MACHINE

Theodore Ongaro, Columbus, Ohio

Application November 16, 1935, Serial No. 50,236

16 Claims. (Cl. 73—51)

My invention relates to a balancing machine. It has to do, more particularly, with a machine which is particularly adaptable for use in balancing automobile wheels under dynamic conditions simulating the conditions encountered in actual use of the wheel on the automobile. However, this machine is not necessarily limited to balancing automobile wheels but may also be used for balancing a great number of different objects.

It is now customary in balancing automobile wheels to determine whether or not a wheel is in balance and to correct the unbalanced condition under static conditions which are entirely different from those conditions present when the wheel is in actual use on the automobile and is rotated at various speeds. It will be readily apparent that the wheel might be balanced statically but would not be balanced at all dynamically because an unbalanced weight will have an entirely different effect when the wheel is rotated than when it is stationary. Also, the distortion of the tire carried by the automobile wheel which is caused by centrifugal force and which varies at various speeds of rotation of the wheel, has considerable effect on the balance of the wheel. Other conditions make dynamic balancing of the wheel much more desirable.

In the past, a number of dynamic balancing machines have been devised for dynamically balancing objects other than automobile wheels. However, such prior art machines are possessed of certain disadvantages. Most of such machines are very complicated and expensive. One type of prior art balancing machine has been designed for the balancing of rotors. In this type of machine, it is common to employ means for rotating the body to be balanced, together with a pair of weights which are adjustable around the axis of rotation and relative to said body. This type of machine could be employed for balancing bodies of one predetermined diameter, only. Furthermore, in this type of machine, the exact point where weight should be removed from or added to the body to be balanced could not be indicated because the weights could be adjusted around the axis only and could not be adjusted radially. This type of machine also had other undesirable features. In other prior art machines, in balancing the body to be balanced, it is necessary to overcome the resistance of springs or to overcome friction of the machine. Consequently, such machines are not very sensitive. Furthermore, prior art machines have not been provided with means for indicating accurately the amount of weight which must be added to or subtracted from the body to balance it, together with the exact location where the weight should be applied or removed.

One of the objects of my invention is to provide a balancing machine which is particularly suitable for balancing automobile wheels and which is of such a nature that the wheel may be balanced under dynamic conditions simulating the conditions encountered in actual use of the wheel on the automobile.

Another object of my invention is to provide a balancing machine which is of a very simple structure and which requires little or no skill to operate accurately and efficiently.

Another object of my invention is to provide a machine of the type indicated which is of such a nature that it will be very sensitive and will indicate very accurately the amount of unbalance of the body to be balanced, the amount of weight which must be added to or subtracted from the body in order to balance it, and the exact location where the weight should be applied to or removed from the body.

Another object of my invention is to provide a machine for balancing automobile wheels or the like which may be employed for balancing wheels of various diameters.

Various other objects will appear as this description progresses.

In its preferred form, my invention contemplates the provision of a machine embodying a base or standard having the balancing unit mounted on its upper end for universal movement. This balancing unit embodies a spindle or shaft which carries the wheel to be balanced on one end and adjustable weights on the opposite end. The weights on the one end of the spindle or shaft are adapted to be adjusted along the shaft to exactly balance the weight of the wheel so that the shaft will lie in a horizontal plane. Means is provided for rotating the shaft or spindle and, if the wheel to be balanced is out of balance, the shaft will rock on its support or, in other words, each end of the shaft will travel in a circular path. I provide means on the machine for indicating the amount of rocking of the shaft on the support which, in turn, indicates the amount of unbalance of the wheel. I also provide means for rotating the shaft at various speeds and indicating means which preferably indicates the speed of rotation. At the end of the shaft which carries the wheel, I provide an arm which extends radially from opposite sides of the shaft and which is provided with a pair of weights.

These weights are adjustable relative to each other along the arm. The arm is adjustable around the shaft so that it may be advanced or retarded relative to the wheel to be balanced. By adjusting the weights on the arm relative to each other and adjusting the arm around the shaft relative to the wheel, the balancing unit may be brought exactly into balance, regardless of the speed of rotation of the wheel, and the amount of weight to be added to the wheel and the point where it should be added will be indicated exactly by the location of the adjustable weights carried by the said arm.

The preferred embodiment of my invention is illustrated in the accompanying drawings wherein similar characters of reference designate corresponding parts and wherein:

Figure 1 is a perspective view of a balancing machine made in accordance with my invention.

Figure 2 is a detail in side elevation of the arm which carries the radially adjustable weights.

Figure 3 is a transverse section taken substantially on line 3—3 of Figure 2.

Figure 4 is a detail, partly in section and partly in plan, of a portion of the mounting provided for mounting the balancing unit on the standard or base.

Figure 8 is a vertical sectional view of the balancing unit, taken substantially on line 8—8 of Figure 5.

Figure 9 is a horizontal sectional view of the balancing unit, taken substantially on line 9—9 of Figure 8.

Figure 10 is a detail in section taken along line 10—10 of Figure 9, of locking means employed, when desired, for preventing the balancing unit from swinging in one direction on its support.

Figure 5:
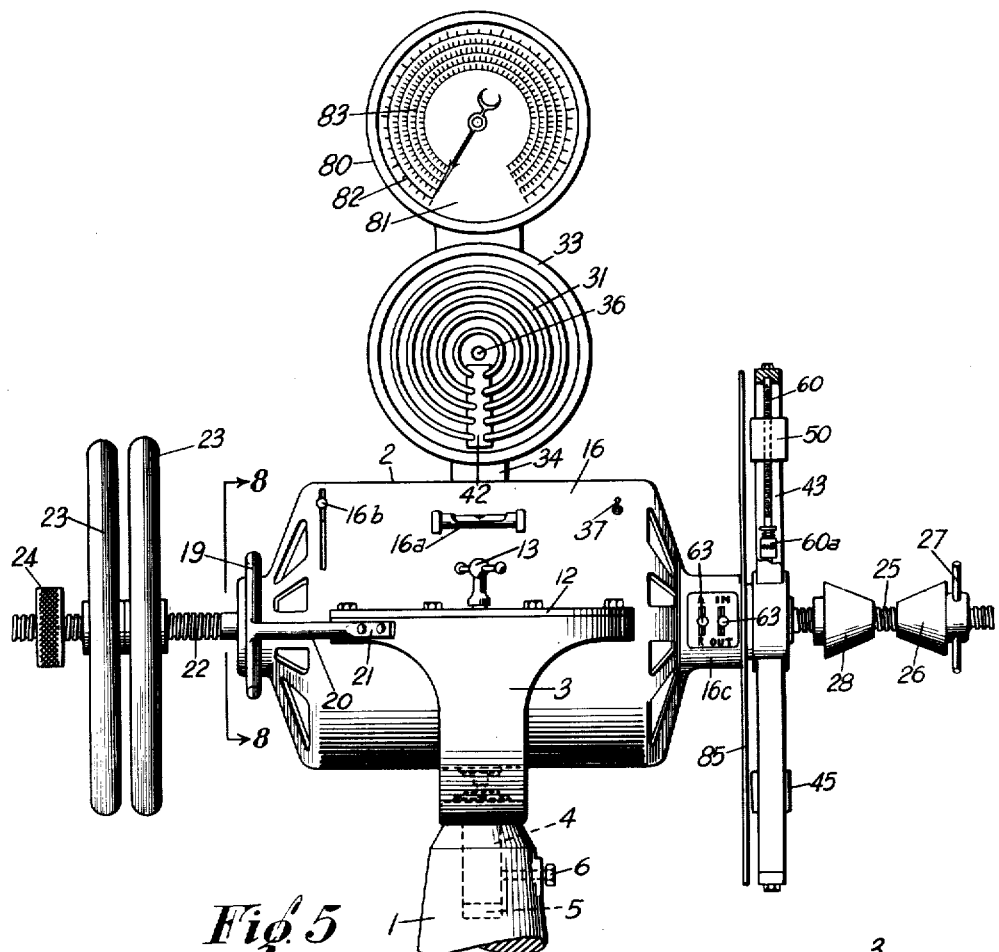
Figure 5 is a front elevation of the balancing unit.

With reference to the drawings and particularly to Figures 1 and 5, I have shown my machine as comprising a base 1 upon the upper end of which is mounted a balancing unit indicated generally by the numeral 2. The balancing unit is mounted on the base for universal movement thereon.

In order to mount the balancing unit 2 on the base 1, I provide an upwardly extending yoke 3. This yoke 3 has a depending pin 4 which fits into a socket 5 formed in the upper end of the standard 1. The pin 4 is held in the socket by a set screw 6. Thus, the yoke is mounted on the upper end of the standard in such a manner that it will be normally held from rotating thereon.

As shown best in Figures 1, 8 and 9, the upper end of each of the arms of the yoke is provided with a segmental or arcuate member 7. Each arcuate member 7 has a raceway 8 formed in the upper surface thereof for the reception of balls 9 (Figure 10). A member 10 has an outer portion 11, corresponding in shape to the member 7, lying in superimposed relation to the member 7 and is provided with a ball raceway 8a formed in its lower surface. An L-shaped member 12 is bolted to the upper surface of the member 7 for retaining the portion 11 of the member 10 in its proper position above the member 7. A screw member 13 is provided and extends through the top flange of the member 12. This screw member may be employed for maintaining the portion 11 of member 10 in any desired position on the member 7.

A pair of the members 10 is provided and each member has a bearing 14 formed on its inner end which receives a trunnion 15 which is free to rotate in the bearing. One of these trunnions projects from each side of an electric motor housing 16 of the balancing unit 2. The trunnions are formed directly opposite each other substantially midway between the ends of the motor housing. They are held in position in the bearings by nuts and washers 17. Thus, it will be apparent that the motor housing may swing in a vertical plane around the axis passing through the trunnions 15. Furthermore, it may swing in a horizontal plane about the axis of the standard 1 which passes through the center of curvature of the arcuate supports 7. In other words, the motor housing which carries other parts of the balancing unit is free to rock universally on the upper end of the standard 1.

The motor disposed in the housing 16 is preferably an electric motor of the variable speed type. A lever 16b is provided for controlling the speed of this motor, in the usual way. The drive shaft 18 of the motor projects from opposite ends of the housing a considerable distance. A collar member 19 of substantially larger diameter than the shaft surrounds the shaft and is disposed adjacent the left hand end of the motor housing 16, as illustrated in Figures 1 and 5. This collar 19 is supported by a pair of arms 20 which are rigidly secured, as at 21, to the members 7. This collar 19 will cooperate with the shaft 18 to limit the rocking movement of the balancing unit.

The left hand end of the shaft 18 is threaded as at 22 for a substantial distance. As shown in Figures 1 and 5, a pair of weight members or wheels 23 are threaded on this shaft for adjustment longitudinally of the shaft. A much smaller member 24 is also threaded on the shaft. These weights themselves are accurately balanced and are provided for counterbalancing the weight of the wheel to be balanced on the machine, as will later appear. A level member 16a of the "bubble" type is preferably provided for indicating when the weight of the wheel W is exactly counterbalanced and the shaft 18 lies in a horizontal plane. However, other level indicators may be employed.

The right hand end of the shaft is also threaded as at 25 for a short distance. A cone-shaped member 26 provided with radially-projecting pins 27 is threaded onto the outer end of the portion 25 of the shaft. A second cone-shaped member 28 is threaded or to the inner end of the portion 25 of the shaft. Thus, an automobile wheel W may be mounted on this end of the shaft by removing the member 26, placing the wheel on the shaft with the shaft passing through the hub thereof, and then again threading the member 26 on the shaft. The two cones, 26 and 28, will cooperate in centering the wheel on the shaft and may be adjusted as close together as necessary to grip the hub of the wheel in order to cause the wheel to rotate with the shaft.

As previously stated, when the wheel is mounted on the machine, its weight may be counterbalanced by adjusting the weights 23 and 24 longitudinally of the shaft. The two weights 23 may be joined together so that they will not rotate relative to the shaft during rotation of the shaft. When the weight of the wheel is counterbalanced, the shaft 18 will lie in a horizontal plane. However, if the wheel is out of balance and the shaft is rotated to cause rotation of the wheel, the entire balancing unit will rock universally on the standard 1. In other words, each end of the shaft 18 will travel in a circular path. The extent of this movement will be limited by the collar 19 cooperating with the shaft 18.

In order to indicate the extent of rocking of the balancing unit on the standard and, consequently, the extent to which the wheel W is out of balance, I provide the following mechanism: On the upper end of the standard 1, I provide a member 29 which is formed of insulating material and is bolted or otherwise secured to the upper surface of the yoke 3 directly above the pin 4. The center of this member 29 is located directly above the axial center of the standard 1. This member 29 carries a plurality of annular electric contact members 30 which are disposed in concentric relation with each other but are spaced apart. Each of the annular contact members 30 is connected to a neon tube 31, which is bent into annular form, by means of a wire 32. I provide a plurality of these annular neon tubes 31 and they preferably correspond in number to the number of annular contact members 30. It will be understood that the smallest annular contact member is connected to the smallest annular neon tube, and the successively larger contact members are connected to the successively larger annular neon tubes.

The neon tubes 31 are preferably mounted in an annular housing 33 which is mounted on the forward end of a curved arm 34 that has its lower and rear end secured to the upper end of the arm of the yoke 3 disposed at the rear side of the machine. A cable 35 which carries the wires 32 preferably passes upwardly to the housing 33 along this arm. The neon tubes 31 are concentric with each other and I preferably provide a pilot light 36 which is disposed at the center within the smallest annular neon tube. This pilot light 36 is preferably a small electric bulb which is connected in series with the main switch 37, provided for the electric motor, so that whenever the motor is turned on, the pilot light 36 will be illuminated.

Figure 6:
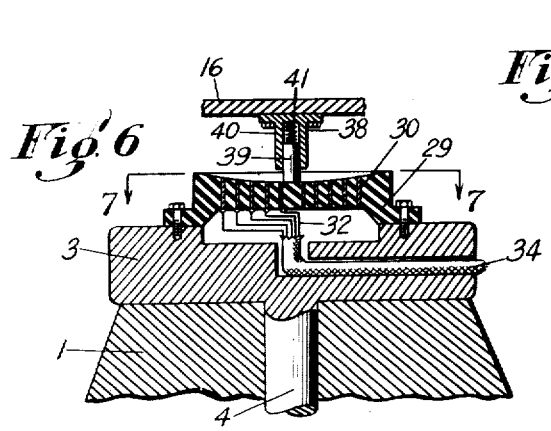
Figure 6 is a detail in section showing the means which is provided for operating the indicator which indicates the amount of unbalance of the balancing unit and, consequently, the wheel to be balanced.
Figure 7:
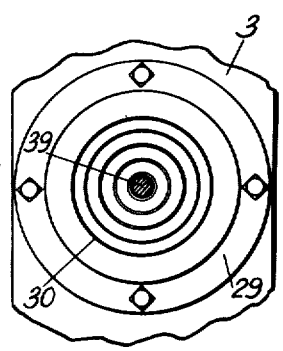
Figure 7 is a section taken substantially on line 7—7 of Figure 6.
Figure 11:
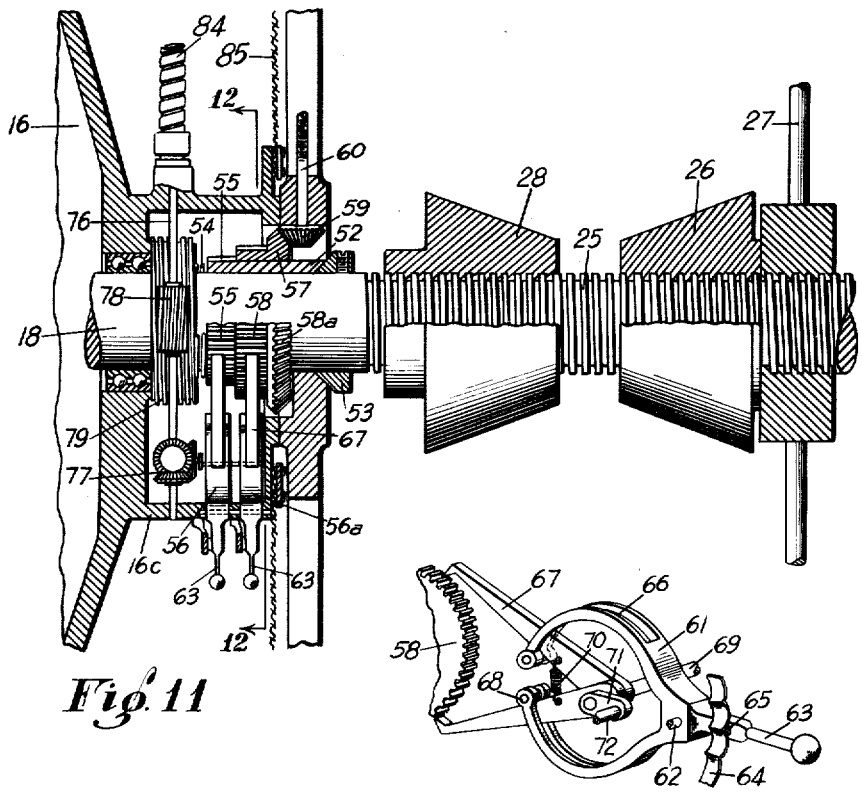
Figure 11 is a detail in section mainly showing the mechanism for adjusting the arm, that carries the adjustable weights, around the shaft and for adjusting the weights carried by the arm relative to each other.

The motor housing 16 has on its lower surface a plunger mechanism 38. This plunger mechanism embodies an electrical contact member 39 mounted for sliding movement in a cylindrical housing 40 and normally urged downwardly by a compression spring 41. The lower end of this contact member 39 contacts with the upper surface of the member 29. The upper surface of this member is preferably concave, as indicated in Figure 6. This contact member 39 is adapted to serve as a ground for each circuit formed by a contact member 30, a wire 32, and a neon tube 31, and when it contacts with the contact member 30 it completes the circuit so that the neon tube of that particular circuit will be illuminated. The member 39 is preferably of such a diameter that it just bridges the space between any two of the contact members 30. Thus, before the member 39 moves out of contact with one of the members 30 it will contact the adjacent member 30. This will ensure that at least one of the annular neon tubes 31 will be illuminated at all times when the balancing unit is out of balance. However, the innermost or smallest contact member 30 is preferably slightly larger in diameter than the contact member 39 so that when the balancing unit is exactly in balance, none of the neon tubes 31 will be illuminated. I preferably provide a small plate 42 with indications directly coinciding with the tubes 31 for indicating the percentage of unbalance of the balancing unit. Instead of the means which I have just described for indicating when the balancing unit is out of balance, I may supply other indicating means.

It will be apparent that, if the balancing unit rocks on the standard, due to the fact that the wheel W is out of balance, the member 39 will be swung away from the center of the member 29. If the wheel is very much out of balance, the member 39 will contact with the outermost member 30. If the balancing unit is then gradually balanced, by means to be described later, the member 39 will gradually move in towards the center of the member 29 contacting with the successive contact members 30 and, consequently lighting the successive neon tubes 31, until it reaches the position indicated in Figure 6, when all of the neon tubes will be dark. This will indicate that the balancing unit is exactly in balance.

In order to bring the balancing unit into balanced condition when a wheel, which is unbalanced, is mounted on the shaft 18 and the shaft is rotated and, in order to indicate where the weight is to be applied to the wheel and the amount of weight to be applied, I provide the mechanism to be described now in detail. This mechanism is shown best in Figures 1, 2, 5 and 11 to 13. It comprises an arm member 43 which extends radially from opposite sides of the shaft 18. This arm is shown best in Figure 2. Each end of the arm is bifurcated as indicated at 44 in this figure. On one end of the arm 43, between the bifurcations thereof, is disposed a weight member 45 as illustrated in Figure 3. This weight member comprises a body portion provided with a flange 46 that overlaps one side of the arm and has a plate 47 secured thereto that overlaps the other side of the arm. Thus, this weight may be moved longitudinally of the arm. The weight 45 is provided with a plunger lock 48 which is adapted to engage rack teeth 49 in order to maintain the weight in any predetermined position on the arm. The opposite end of the arm 43 carries a weight 50 which may be adjusted manually or may be adjusted automatically during operation of the machine, by mechanism to be described.

The arm 43 is provided with a hub or sleeve 52 formed integrally therewith. The outer end of sleeve 52 abuts a collar 53 keyed on shaft 18 and is held in frictional contact therewith by a spring 54 that surrounds the shaft and presses against the opposite end of the sleeve. The sleeve 52 may be positively rotated relative to the shaft 18 but it normally rotates with the shaft because of the frictional engagement of the end of the sleeve with collar member 53. The inner end of the sleeve 52 has gear teeth 55 formed thereon and a ratchet device 56 is provided for engaging these teeth to rotate the sleeve 52 positively relative to the shaft 18 in either direction. A gear 57 is mounted on the sleeve 52 in such a manner that it may be rotated thereon. This gear 57 is provided with teeth 58 adapted to be engaged by a ratchet device 56a by means of which it may be rotated in either direction on the sleeve 52. The gear 57 is further provided with bevel gear teeth 58a which mesh with a small bevel gear 59. This bevel gear 59 is keyed on the lower end of the shaft 60 which is mounted for rotation on the arm 43, as indicated best in Figure 2. This shaft 60 is threaded through the weight 50 carried by the arm 43. Rotation of the shaft 60 is adapted to move the weight 50 radially of the arm 43, as will be readily apparent.

Figure 13:
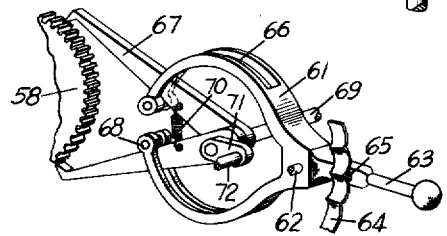
Figure 13 is a detail of ratchet mechanism employed in the mechanism illustrated in Figures 11 and 12.

The ratchet mechanism 56 is exactly the same as the ratchet mechanism 56a and one of these mechanisms is illustrated in detail in Figure 13. It comprises a bifurcated lever member 61 which is pivoted to the extension 16c of the motor housing by a pin 62. A handle 63 is provided for swinging this member 61 about the pivot 62. A notch spring member 64 engages a lug 65 on the handle 63 to maintain the member 61 in any desired adjusted position. Each arm of the bifurcated member 61 is curved and has a slot 66 formed therein. A pawl member 67 projects through each of these slots. Small pins 68 close the outer ends of these slots 66 and prevent the pawl members 67 from moving out of said slots. The inner end of each pawl member 67 is pivoted to a shaft 69 disposed with the member 66. The pawl members 67 extend through the slot 66 in diverging relation and the outer ends of these pawl members lie adjacent the periphery of the gear member and at opposite sides thereof, as indicated in Figure 13. A spring 70 is connected to each pawl member and tends to draw these members together but this is prevented by the pin 68. The shaft 69 is carried by a small crank arm 71. This crank arm 71 is keyed on a stub shaft 72 which is suitably mounted in a stationary support. The opposite end of this stub shaft 72 has a bevel gear 73 keyed thereon by which it may be rotated. The bevel gear 73 meshes with a bevel gear 74 keyed on the lower end of a vertical shaft 75 which is driven by a shaft 76 through the medium of bevel gears 77. The shaft 76 is driven by a worm gear 78 which meshes with a worm gear 79 on the shaft 18.

It will be apparent that, when the shaft 18 is rotated, the crank arm 71 will be rotated through the medium of the driving mechanism just described. This will cause the pawl members 67 to move back and forth away from and towards the axis of the shaft 18. As long as the handle member 63 of member 61 is in horizontal position, as indicated in Figure 13, the pawl members will not engage the gear which the particular ratchet mechanism is adapted to rotate. However, if the handle member 63 is swung upwardly, the upper pawl member 67 may engage the gear. Since the shaft 69 is continuously moved towards and away from shaft 18 and, consequently, the pawl members 67 are moved back and forth longitudinally of themselves, the upper pawl member 67 will rotate the gear step-by-step. When it has been rotated sufficiently in the one direction, the handle 63 may be swung back into the neutral position indicated in Figure 13. If it is desired to rotate the gear in the opposite direction, it is merely necessary to swing the handle member 63 downwardly to cause the lower pawl member 67 to become operative and to engage the gear so as to rotate it step-by-step in the opposite direction. Thus, it will be apparent that the ratchet mechanism 56 may be operated to rotate the sleeve 52 in either direction relative to shaft 18 and, consequently, cause the arm 43 to swing around the shaft. The ratchet mechanism 56a may be operated to rotate the gear 57 on the sleeve 52, in either direction, to move the weight 50 in or out on the arm.

Figure 12:
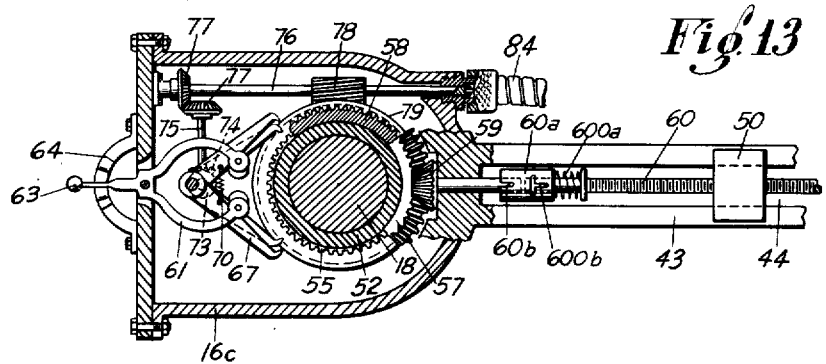
Figure 12 is a section taken substantially along line 12—12 of Figure 11.

I also provide means for manually adjusting weight 50 along the arm 43. As shown in Figures 2 and 12, shaft 60 is split but is normally coupled together by a sleeve 60a. One end of this sleeve has an open-ended slot 60b and the other end has a T-shaped slot 600b, each of which cooperates with a pin on one section of the shaft. The sleeve is normally held in the position indicated in Figure 12 by a spring 600a. However, it may be moved longitudinally against this spring until the pin is out of slot 60b and the sleeve may be held in this position by rotating sleeve 60a slightly so that the pin will be in the other portion of slot 600b. At this time, the two sections of shaft 60 will be disconnected and the outer section may be manually rotated by sleeve 60a to adjust the weight 50 to the desired position. Thus, weight 60 may be automatically adjusted when the machine is operating or manually adjusted when the machine is not operating.

I provide a speed indicator 80 for indicating the speed of rotation of the wheel W. This indicator is provided with a dial 81 which is suitably calibrated. The outermost row of indications 82 on this dial preferably indicates the speed in revolutions per minute. The other rows 83 of indications preferably indicate the speed of the wheel W in miles per hour, each row indicating the speed for a wheel of a particular size. This indicator is operated by means of a flexible shaft which passes through a flexible tube 84 and is connected to the shaft 76. However, other types of indicators may be employed.

The two levers 63 for operating the ratchet mechanisms 56 and 56a project through slots in the extension 16c of the motor housing. Since these levers are disposed adjacent the point where the wheel W is mounted, I preferably provide a guard member 85 which will eliminate any chance of the operator being injured by the rotating wheel W when he is adjusting the hand lever 63.

I will now describe how I use my machine in balancing an automobile wheel. The wheel W is first mounted on the end of the shaft by removing the cone member 26 and replacing it after the wheel is on the shaft. During the time the wheel is being positioned on the shaft, the screw lock 13 may be employed for preventing the balancing unit from swinging in a horizontal plane. The wheel is preferably measured before it is positioned on the shaft so that the diameter of the rim thereof is known. Then, before it is positioned on the shaft, the manually adjustable weight 45 on arm 43 is preferably adjusted away from the axis of the shaft 18 a distance equal to the radius of the rim of the wheel to be balanced. This distance will be indicated by calibrations preferably carried by the arm 43. The weight 50 is also similarly adjusted by adjusting sleeve 60a.

When the wheel is initially positioned on the shaft 18, it is preferably permitted to freely rotate on the shaft so that its heavy point will be at the bottom. At the time the wheel is positioned on the shaft, the arm 43 is preferably vertically disposed with the pre-adjusted weight 45 at the bottom. The cone member 26 is then rotated so that the hub of the wheel will be tightly gripped between this member and the member 28 and, consequently, the wheel will be tightly clamped to the shaft 18 so that it will rotate therewith. The weights 23 are then adjusted longitudinally of the shaft 18 merely by rotating them in the proper direction in order to counterbalance the weight of the wheel W. The smaller weights 24 may be used to obtain finer adjustments in order to get the balancing unit exactly in balanced condition. When the unit is in balance, it will be indicated by the level 16a. Thus, the entire unit may be brought into balance.

The switch 37 is then operated to cause the motor to operate and to rotate the shaft 18. If the wheel W is out of balance, the balancing unit will begin to rock on the standard 1. The amount of rocking and, consequently, the amount that the wheel is out of balance will be indicated by the neon tubes 31, one of which will always be illuminated, if the balancing unit is unbalanced. The shaft 18 may be rotated at any speed which will be determined by setting the lever 16b which controls the speed of the variable speed electric motor. It is preferable to rotate the wheel W at various speeds to determine at which speed the wheel is the most unbalanced. This will be indicated by the neon tube indicator. The speed of rotation of the wheel both in revolutions per minute and miles per hour will be indicated on the dial 81.

With the wheel rotating at the speed that brings about the worst unbalanced condition, the machine is adjusted to bring the balancing unit back into balanced condition. To do this, the proper hand lever 63 is operated to move the weight 50 in or out on the arm 43, depending upon which way it must be moved to bring the balancing unit more nearly into balanced condition, which will be readily indicated by the neon tube indicator. If it is necessary to move the weight 50 outwardly from its original position, this indicates that weight should be added to the rim at the side thereof where the weight 50 is disposed. If the weight 50 must be moved inwardly to bring the unit more nearly into balance, this indicates that weight must be taken off the wheel at the side where the weight 50 is disposed or that weight must be added to the rim at the opposite side. Of course, it will be understood that it is easier to attach weights to the rim to balance the wheel than it is to remove weight from the wheel.

Radial adjustment of the weight 50 may not be sufficient to bring the balancing unit into balanced condition. If it is not, it will be necessary to rotate the arm 43 relative to the wheel W or, in other words, advance or retard the weights relative to the wheel. This may be done by operating the other hand lever 63. Thus, by radially adjusting the weight 50 and by changing the angular positions of the weights 45 and 50 relative to the wheel W, the balancing unit may be brought exactly into balance. Since the balancing unit is originally statically balanced and there are no springs or friction of the machine to be overcome in bringing the unit into balance under dynamic conditions, the machine will be very sensitive. When the unit is brought exactly into balanced condition as indicated by the neon tube indicator, the machine may be stopped and the rim of the wheel marked at a point exactly opposite that side of the arm 43 which carries the weight 50. This will indicate the position along the circumference of the wheel where the weight correction should be made. As previously stated, if it were necessary to move the weight 50 outwardly from its initial set position, it will be necessary to add weight to the rim at this point. The amount of weight that must be added will be indicated by the distance of the weight 50 from the axis of the shaft 18. The arm 43 may be calibrated in such a manner that it not only will indicate the distance of the weight 50 from the axis of rotation but will also indicate the amount of weight, preferably in ounces, which must be added to the rim. If the weight 50 were moved inwardly from its initial position, weight should be added to the rim at a diametrically opposite point and the amount which should be added will be indicated by the distance which it was necessary to move the weight 50 from its initial position inwardly to its final position necessary in bringing about balancing of the unit.

After the wheel has been balanced for one speed, it is desirable to rotate it through the entire range of speeds. If it is found that the wheel is not balanced at all speeds, it will be necessary to compromise between the various speeds or have the wheels balanced at the speed where the unbalanced condition is the most undesirable.

Although I specify that arm 43 may be rotated or swung around shaft 18 to different positions relative to the wheel W to be balanced, it will be apparent that the wheel to be balanced should be rotated relative to arm 43 in the balancing operation.

It will be apparent from the above description that I have provided a balancing machine having many desirable features. It is particularly useful in balancing automobile wheels although it is not necessarily limited thereto. With this machine, the wheel is balanced under dynamic conditions and may be rotated at any speed so as to simulate the conditions encountered in actual use of the wheel.

My machine is of a very simple structure and requires little or no skill to operate accurately and efficiently. An important feature of my machine is that the wheel carried by the balancing unit is initially counterbalanced under static conditions. There are no springs or no friction to overcome in the balancing operation. Any slight unbalanced condition of the wheel will cause the balancing unit to become unbalanced when the wheel is rotated since the machine is thus very sensitive. The machine will indicate the percentage of unbalance of the balancing unit and will indicate its gradual approach to balanced condition which may be brought about by proper adjustment of the balancing weights. Furthermore, the amount of weight which must be added to or subtracted from the wheel and the exact location where the weight should be applied to or removed from the wheel will be very accurately indicated. Another important feature of my machine lies in the fact that it may be employed for balancing wheels of various diameters.

In the claims where I specify that the arm that carries the balancing weights is rotated around the axis of rotation relative to the body to be balanced, I also intend to cover rotation of the body itself relative to the arm that carries the balancing weights.

I claim:

1. A balancing machine comprising a balancing unit including a shaft, means for mounting the shaft at a point intermediate its ends for universal rocking movement, means for rotating the shaft, means for mounting a body to be balanced on one end of said shaft, weights on the other end of said shaft adjustable longitudinally thereof for counterbalancing the weight of said body, an arm carried by said shaft on the end which carries the body, said arm extending radially from the shaft at opposite sides thereof, and a balancing weight carried on each end of said arm, the balancing weights carried by said arm being adjustable towards or away from each other.

2. A balancing machine comprising a balancing unit including a shaft, means for supporting the shaft at a point intermediate its ends for universal rocking movement, means for rotating the shaft, means for mounting a body to be balanced on one end of the shaft, weights on the other end of said shaft adjustable longitudinally thereof for counterbalancing the weight of said body, an arm carried by said shaft on the end which carries the body, said arm extending radially from the shaft at opposite sides thereof, a balancing weight carried on each end of said arm, the balancing weights carried by said arm being adjustable thereon towards or away from each other, and said arm being adjustable around the shaft and relative to said body.

3. A balancing machine comprising a balancing unit including a shaft, means for supporting the shaft at a point intermediate its ends for universal rocking movement, means for rotating the shaft, means for mounting a body to be balanced on one end of the shaft, weights on the other end of said shaft adjustable longitudinally thereof for counterbalancing the weight of said body, an arm carried by said shaft on the end which carries the body, said arm extending radially from the shaft at opposite sides thereof, a balancing weight carried on each end of said arm, means for adjusting the balancing weights relative to each other during rotation of said shaft, and means for adjusting said arm around the shaft and relative to the body during rotation of said shaft.

4. A balancing machine comprising a balancing unit including an electric motor having a drive shaft projecting from each end thereof, said electric motor being carried by a standard for universal rocking movement relative thereto, means for mounting a body to be balanced on one end of the shaft, weights on the other end of said shaft adjustable longitudinally thereof for counterbalancing the weight of said body, an arm carried by said shaft on the end which carries the body, an arm extending radially from the shaft at opposite sides thereof, a balancing weight carried on each end of said arm, means for adjusting the balancing weights relative to each other during rotation of said shaft, and means for adjusting said arm around the shaft and relative to the body during rotation of said shaft.

5. A balancing machine comprising a vertically disposed standard, a balancing unit mounted on said standard for universal rocking movement thereon, said balancing unit being complete in itself and the universal mounting being the only mechanical connection between said balancing unit and said standard, said balancing unit being free to rock on said standard without overcoming substantially any forces except those due to unbalanced weight, said balancing unit comprising an electric motor having a drive shaft projecting from each end thereof and being substantially horizontally disposed, means for mounting a body to be balanced on one end of said shaft in such a manner that it will rotate therewith, a counterbalance weight carried by the other end of said shaft and being adjustable thereon to counterbalance the weight of the body to be balanced, said counterbalance weight being adapted to rotate with the shaft, means for indicating whether or not the body is balanced by the counterbalance weight when the shaft is not rotating, a plurality of balancing weights carried by a member at the other end of the shaft adjacent the body to be balanced, said member being adapted to rotate with the shaft, said weights being adjustable radially relative to the shaft, said member being adjustable around the shaft and relative to the body to be balanced, means for radially adjusting said balancing weights during rotation of said shaft, means for adjusting said member around the shaft and relative to the body to be balanced during rotation of said shaft, means for indicating whether or not said balancing unit is in balanced condition during rotation of the body to be balanced, means for varying the speed of rotation of said shaft, and means for indicating the speed of rotation of said shaft.

6. A balancing machine comprising a vertically disposed standard, a balancing unit mounted on said standard for universal rocking movement thereon, said balancing unit being complete in itself and the universal mounting being the only mechanical connection between said balancing unit and said standard, said balancing unit being free to rock on said standard without overcoming substantially any forces except those due to unbalanced weight, said balancing unit including a drive shaft projecting from opposite sides of the standard and being substantially horizontally disposed, means for mounting the body to be balanced on one end of said shaft in such a manner that it will rotate therewith, a counterbalance weight carried by the other end of said shaft for counterbalancing the weight of the body to be balanced, said counterbalance weight being adapted to rotate with the shaft, means for indicating whether or not the body is balanced by the counterbalance weight when the shaft is not rotating, a balancing weight carried at the other end of said shaft adjacent the body to be balanced, said weight being adjustable radially relative to the shaft, said weight being also adjustable around the axis of the shaft and relative to the body to be balanced, means for radially adjusting said balancing weight during rotation of said shaft, means for adjusting said balancing weight around the axis of the shaft and relative to the body to be balanced during rotation of said shaft, means for indicating whether or not said balancing unit is in balanced condition during rotation of the body to be balanced, means for varying the speed of rotation of said shaft, and means for indicating the speed of rotation of said shaft.

7. A balancing machine comprising a vertically disposed standard, a balancing unit mounted on said standard for universal rocking movement thereon, said balancing unit being complete in itself and the universal mounting being the only mechanical connection between said balancing unit and said standard, said balancing unit being free to rock said standard without overcoming substantially any forces except those due to unbalanced weight, said balancing unit including a drive shaft projecting in opposite directions from the point where the balancing unit is supported and being normally substantially horizontally disposed, means for mounting the body to be balanced on one end of said shaft in such a manner that it will rotate therewith, a counterbalance weight carried by the other end of said shaft for counterbalancing the weight of the body to be balanced, said counterbalance weight being adapted to rotate with the shaft, a balancing weight carried at the other end of said shaft adjacent the body to be balanced, said weight being adjustable radially relative to the shaft, said weight being also adjustable around the axis of the shaft and relative to the body to be balanced, means for radially adjusting said balancing weight during rotation of said shaft, means for adjusting said balancing weight around the axis of the shaft and relative to the body to be balanced during rotation of said shaft, and means for indicating whether or not said balancing unit is in balanced condition during rotation of the body to be balanced.

8. A balancing machine comprising a vertically disposed standard, a balancing unit mounted on said standard for universal rocking movement thereon, said balancing unit being complete in itself and the universal mounting being the only mechanical connection between said balancing unit and said standard, said balancing unit being free to rock on said standard without overcoming substantially any forces except those due to unbalanced weight, said balancing unit including a drive shaft projecting in opposite directions from the point where the balancing unit is supported and being normally substantially horizontally disposed, means for mounting the body to be balanced on one end of said shaft in such a manner that it will rotate therewith, means on the other end of the shaft for substantially counterbalancing the weight of the body to be balanced, a balancing weight carried at the other end of said shaft adjacent the body to be balanced, said weight being adjustable radially relative to the shaft, said weight and said body to be balanced being adjustable relative to each other in such a manner that the weight may be advanced or retarded relative to said body, means for radially adjusting said balancing weight during rotation of said shaft, and means for advancing or retarding said weight relative to the body during rotation thereof.

9. A balancing machine comprising a vertically disposed standard, a balancing unit mounted on said standard for universal rocking movement thereon, said balancing unit being complete in itself and the universal mounting being the only mechanical connection between said balancing unit and said standard, said balancing unit being free to rock on said standard without overcoming substantially any forces except those due to unbalanced weight, means for mounting the body to be balanced on said balancing unit in such a manner that it may rotated, means for substantially counterbalancing the weight of the body to be balanced, a balancing weight carried by said balancing unit and adapted to rotate with the body, said weight being adjustable in and out relative to the center of the article being balanced, said weight and said body to be balanced being adjustable relative to each other in such a manner that the weight may be advanced or retarded relative to said body, means for adjusting said balancing weight in and out during rotation of said body, and means for advancing or retarding said weight relative to the body during rotation thereof.

10. A machine for balancing a rotating flexible mass, comprising a balancing unit mounted on a standard for universal rocking movement thereon, means for mounting the body to be balanced on said balancing unit in such a manner that it may be rotated at various speeds, means for rotating said body, means for substantially counter-balancing the weight of the body to be balanced, balancing weights carried by said balancing unit and adapted to rotate with the body, said weights being adjustable radially relative to the axis of the article being balanced, said weights and said body to be balanced being adjustable relative to each other in such a manner that the weights may be advanced or retarded around the axis of and relative to said body, means for radially adjusting one of the said balancing weights preliminary to rotation, means for radially adjusting other of said balancing weights during rotation, means for advancing or retarding said weights relative to the body during rotation thereof, means for indicating whether or not the balancing unit is in balanced condition during rotation of the body to be balanced, means for varying the speed of rotation of said body, and means for indicating the speed of rotation of said body.

11. A balancing machine comprising a supporting standard, a balancing unit mounted on said standard for universal rocking movement thereon, said balancing unit being complete in itself and the universal mounting being the only mechanical connection between said balancing unit and said standard, said balancing unit being free to rock on said standard without overcoming substantially any forces except those due to unbalanced weight, means for mounting the body to be balanced on said balancing unit in such a manner that it may be rotated, means for substantially counter-balancing the weight of the body to be balanced, a balancing weight carried by said balancing unit and adapted to rotate with the body, said weight being adjustable in and out relative to the center of the article being balanced, said weight and said body to be balanced being adjustable relative to each other in such a manner that the weight may be advanced or retarded relative to said body, means for adjusting said balancing weight in and out during rotation of said body, and means for advancing or retarding said weight relative to the body during rotation thereof.

12. A means for determining the alteration necessary to balance a rotating mass comprising a rotatable shaft, a motor carried on said shaft intermediate its ends for effecting rotation thereof, means for supporting said rotatable shaft intermediate its ends upon a universal pivot structure, means for mounting the mass to be balanced upon a load receiving part of said shaft, means for counterbalancing the shaft thus loaded to provide equal force moments on opposite sides of the said universal pivotal support so that said shaft will be free to vibrate if rotated with its load receiving part dynamically unbalanced and will be free to rotate without vibration if rotated with its load receiving part dynamically balanced, and means carried upon the load receiving part of said shaft and adjustable with relation thereto to compensate for differences in mass of the various portions of the mass to be balanced at different speeds of rotation of the shaft, said means being adjustable during rotation of said shaft to produce a state of dynamic balance of the mass plus said means.

13. A means for balancing a rotating mass comprising a rotatable shaft, a motor carried on said shaft intermediate its ends for effecting rotation thereof, means for supporting said rotatable shaft intermediate its ends upon a universal pivot structure, means for mounting the mass to be balanced upon the load receiving part of said shaft, means for counterbalancing the shaft thus loaded to provide equal force moments on opposite sides of the said universal pivotal support so that said shaft will be free to vibrate if rotated with its load receiving part dynamically unbalanced and will be free to rotate without vibration if rotated with its load receiving part dynamically balanced, and means carried upon the load receiving part of said shaft and adjustable with relation thereto to compensate for differences in mass of the various portions of the mass to be balanced at different speeds of rotation of the shaft, said means comprising a member carrying two weights designed for initial adjustment radially of said shaft to equal distances from the axis of said shaft and one of said weights being adjustable radially during rotation of the loaded shaft.

14. A means for balancing a rotating mass comprising a rotatable shaft, a motor carried on said shaft intermediate its ends for effecting rotation thereof, means for supporting said rotatable shaft intermediate its ends upon a universal pivot structure, means for mounting the mass to be balanced upon the load receiving part of said shaft, means for counterbalancing the shaft thus loaded to provide equal force moments on opposite sides of the said universal pivotal support so that said shaft will be free to vibrate if rotated with its load receiving part dynamically unbalanced and will be free to rotate without vibration if rotated with its load receiving part dynamically balanced, and means carried upon the load receiving part of said shaft and adjustable with relation thereto to compensate for differences in mass of the various portions of the mass to be balanced at different speeds of rotation of the shaft, said means comprising a member carrying two weights designed for initial adjustment radially of said shaft to equal distances from the axis of said shaft and one of said weights being adjustable radially during rotation of the loaded shaft, and being also adjustable around the said shaft.

15. A means for balancing a rotating mass comprising a rotatable shaft, means for supporting said rotatable shaft intermediate its ends upon a universal pivot structure, means for rotating said shaft, means for mounting the mass to be balanced upon the load receiving part of said shaft, means for counterbalancing the shaft thus loaded to provide equal force moments on opposite sides of the said universal pivotal support so that said shaft will be free to vibrate if rotated with its load receiving part dynamically unbalanced and will be free to rotate without vibration if rotated with its load receiving part dynamically balanced, and means carried upon the load receiving part of said shaft and adjustable with relation thereto to compensate for differences in mass of the various portions of the mass to be balanced at different speeds of rotation of the shaft, said means being adjustable during rotation of said shaft.

16. A means for determining the alteration necessary to balance a rotating mass comprising a rotatable shaft, means for supporting said rotatable shaft upon a universal pivot structure, means for rotating said shaft, means for mounting the mass to be balanced upon a load receiving part of said shaft, means cooperating with said universal pivot structure for insuring that said shaft will be free to vibrate if rotated with its load receiving part dynamically unbalanced and will be free to rotate without vibration if rotated with its load receiving part dynamically balanced, means carried upon the load receiving part of said shaft and adjustable with relation thereto to compensate for differences in mass of the various portions of the mass to be balanced at different speeds of rotation of said shaft, and means for electrically indicating the extent of vibration of said loaded shaft during rotation and attainment of substantial elimination of vibration, said last-named means comprising a series of spaced contacts, a complemental contact and a series of signals operable thereby.

THEODORE ONGARO.

---

CERTIFICATE OF CORRECTION.

Patent No. 2,160,314. May 30, 1939.

THEODORE ONGARO.

It is hereby certified that error appears in the printed specification of the above numbered patent requiring correction as follows: Page 1, second column, line 1, before the word "weight" insert unbalance of the body and the amount of; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.

said shaft intermediate its ends for effecting rotation thereof, means for supporting said rotatable shaft intermediate its ends upon a universal pivot structure, means for mounting the mass to be balanced upon the load receiving part of said shaft, means for counterbalancing the shaft thus loaded to provide equal force moments on opposite sides of the said universal pivotal support so that said shaft will be free to vibrate if rotated with its load receiving part dynamically unbalanced and will be free to rotate without vibration if rotated with its load receiving part dynamically balanced, and means carried upon the load receiving part of said shaft and adjustable with relation thereto to compensate for differences in mass of the various portions of the mass to be balanced at different speeds of rotation of the shaft, said means comprising a member carrying two weights designed for initial adjustment radially of said shaft to equal distances from the axis of said shaft and one of said weights being adjustable radially during rotation of the loaded shaft.

14. A means for balancing a rotating mass comprising a rotatable shaft, a motor carried on said shaft intermediate its ends for effecting rotation thereof, means for supporting said rotatable shaft intermediate its ends upon a universal pivot structure, means for mounting the mass to be balanced upon the load receiving part of said shaft, means for counterbalancing the shaft thus loaded to provide equal force moments on opposite sides of the said universal pivotal support so that said shaft will be free to vibrate if rotated with its load receiving part dynamically unbalanced and will be free to rotate without vibration if rotated with its load receiving part dynamically balanced, and means carried upon the load receiving part of said shaft and adjustable with relation thereto to compensate for differences in mass of the various portions of the mass to be balanced at different speeds of rotation of the shaft, said means comprising a member carrying two weights designed for initial adjustment radially of said shaft to equal distances from the axis of said shaft and one of said weights being adjustable radially during rotation of the loaded shaft, and being also adjustable around the said shaft.

15. A means for balancing a rotating mass comprising a rotatable shaft, means for supporting said rotatable shaft intermediate its ends upon a universal pivot structure, means for rotating said shaft, means for mounting the mass to be balanced upon the load receiving part of said shaft, means for counterbalancing the shaft thus loaded to provide equal force moments on opposite sides of the said universal pivotal support so that said shaft will be free to vibrate if rotated with its load receiving part dynamically unbalanced and will be free to rotate without vibration if rotated with its load receiving part dynamically balanced, and means carried upon the load receiving part of said shaft and adjustable with relation thereto to compensate for differences in mass of the various portions of the mass to be balanced at different speeds of rotation of the shaft, said means being adjustable during rotation of said shaft.

16. A means for determining the alteration necessary to balance a rotating mass comprising a rotatable shaft, means for supporting said rotatable shaft upon a universal pivot structure, means for rotating said shaft, means for mounting the mass to be balanced upon a load receiving part of said shaft, means cooperating with said universal pivot structure for insuring that said shaft will be free to vibrate if rotated with its load receiving part dynamically unbalanced and will be free to rotate without vibration if rotated with its load receiving part dynamically balanced, means carried upon the load receiving part of said shaft and adjustable with relation thereto to compensate for differences in mass of the various portions of the mass to be balanced at different speeds of rotation of said shaft, and means for electrically indicating the extent of vibration of said loaded shaft during rotation and attainment of substantial elimination of vibration, said last-named means comprising a series of spaced contacts, a complemental contact and a series of signals operable thereby.

THEODORE ONGARO.

---

CERTIFICATE OF CORRECTION.

Patent No. 2,160,314.  May 30, 1939.

THEODORE ONGARO.

It is hereby certified that error appears in the printed specification of the above numbered patent requiring correction as follows: Page 1, second column, line 1, before the word "weight" insert unbalance of the body and the amount of; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.